US010803600B2

(12) United States Patent
Kaino et al.

(10) Patent No.: US 10,803,600 B2
(45) Date of Patent: Oct. 13, 2020

(54) INFORMATION PROCESSING DEVICE, INFORMATION PROCESSING METHOD, AND PROGRAM

(71) Applicant: Sony Corporation, Tokyo (JP)

(72) Inventors: Akihiko Kaino, Kanagawa (JP); Shingo Tsurumi, Saitama (JP); Masashi Eshima, Chiba (JP); Takaaki Kato, Tokyo (JP); Masaki Fukuchi, Tokyo (JP); Tatsuki Kashitani, Tokyo (JP); Shunichi Homma, Tokyo (JP)

(73) Assignee: Sony Corporation, Tokyo (JP)

( * ) Notice: Subject to any disclaimer, the term of this patent is extended or adjusted under 35 U.S.C. 154(b) by 86 days.

(21) Appl. No.: 15/761,893

(22) PCT Filed: Sep. 16, 2016

(86) PCT No.: PCT/JP2016/077427
§ 371 (c)(1),
(2) Date: Mar. 21, 2018

(87) PCT Pub. No.: WO2017/057054
PCT Pub. Date: Apr. 6, 2017

(65) Prior Publication Data
US 2018/0286056 A1  Oct. 4, 2018

(30) Foreign Application Priority Data
Sep. 30, 2015 (JP) .................................. 2015-194554

(51) Int. Cl.
*G06T 7/246* (2017.01)
*G06T 7/73* (2017.01)
(Continued)

(52) U.S. Cl.
CPC ................ *G06T 7/246* (2017.01); *G06T 7/20* (2013.01); *G06T 7/292* (2017.01); *G06T 7/70* (2017.01);
(Continued)

(58) Field of Classification Search
CPC . G06T 2207/10021; G06T 2207/30252; G06T 7/246; G06T 7/73; H04N 5/28
(Continued)

(56) References Cited

U.S. PATENT DOCUMENTS 9,201,424 B1 * 12/2015 Ogale ........................ G06T 7/80
10,013,761 B2 * 7/2018 Natroshvili ................ G06T 7/80
(Continued)

FOREIGN PATENT DOCUMENTS

EP    2 309 225 A1    4/2011
JP    2007-278871    * 10/2007
(Continued)

OTHER PUBLICATIONS

Written Opinion and English translation thereof dated Dec. 13, 2016 in connection with International Application No. PCT/JP2016/077427.
(Continued)

*Primary Examiner* — Ricky Chin
(74) *Attorney, Agent, or Firm* — Wolf, Greenfield & Sacks, P.C.

(57) ABSTRACT

The present disclosure relates to an information processing device, an information processing method, and a program capable of performing continuous estimation of a self-position.
An information processing device according to an aspect of the present disclosure includes: a main imaging unit that includes a stereo camera mounted on a moving body, and captures moving images at a predetermined frame rate to
(Continued)

output a pair of stereo main images as time-series images; a plurality of sub imaging units each of which is so mounted on the moving body as to have an imaging direction different from an imaging direction of the main imaging unit, and captures moving images at a predetermined frame rate; and a final pose determination unit that estimates a pose of the moving body on the basis of the pair of stereo main images captured by the main imaging unit, and sub images captured by the sub imaging units. For example, the present disclosure is applicable to a self-position sensor for in-vehicle use.

8 Claims, 13 Drawing Sheets

(51) Int. Cl.
     H04N 5/28      (2006.01)
     G06T 7/292     (2017.01)
     G06T 7/70      (2017.01)
     G06T 7/80      (2017.01)
     G06T 7/20      (2017.01)

(52) U.S. Cl.
     CPC .................. G06T 7/73 (2017.01); G06T 7/85 (2017.01); H04N 5/28 (2013.01); G06T 2207/10021 (2013.01); G06T 2207/30252 (2013.01)

(58) Field of Classification Search
     USPC .................................. 348/148; 382/106, 195
     See application file for complete search history.

(56) References Cited

U.S. PATENT DOCUMENTS

| | | | |
|---|---|---|---|
| 10,508,911 B2 | 12/2019 | Tsurumi et al. | |
| 2007/0165908 A1* | 7/2007 | Braeunl | G06K 9/00812 382/104 |
| 2007/0229238 A1* | 10/2007 | Boyles | G06K 9/00369 340/435 |
| 2010/0046802 A1* | 2/2010 | Watanabe | G06T 7/564 382/106 |
| 2010/0220173 A1* | 9/2010 | Anguelov | H04N 5/2628 348/36 |
| 2011/0096957 A1* | 4/2011 | Anai | G01C 11/10 382/106 |
| 2011/0243452 A1 | 10/2011 | Sakaguchi et al. | |
| 2012/0114181 A1* | 5/2012 | Borthwick | G06T 7/593 382/104 |
| 2012/0155775 A1* | 6/2012 | Ahn | G05D 1/0272 382/195 |
| 2016/0063703 A1* | 3/2016 | Sasaki | G06T 7/85 348/135 |
| 2017/0169300 A1* | 6/2017 | Heisele | G06T 7/74 |
| 2017/0205832 A1* | 7/2017 | Iimura | G05D 1/0253 |
| 2018/0274915 A1 | 9/2018 | Tsurumi et al. | |
| 2018/0278925 A1* | 9/2018 | Okouneva | H04N 5/247 |
| 2018/0286056 A1* | 10/2018 | Kaino | G06T 7/73 |
| 2018/0288401 A1 | 10/2018 | Eshima et al. | |
| 2018/0300898 A1 | 10/2018 | Eshima et al. | |
| 2019/0168670 A1* | 6/2019 | Gupta | H04N 17/00 |

FOREIGN PATENT DOCUMENTS

| | | |
|---|---|---|
| JP | 2007-278871 A | 10/2007 |
| JP | 2008-304268 A | 12/2008 |
| JP | 2010-014450 A | 1/2010 |
| JP | 2014-216813 A | 11/2014 |
| WO | WO 2012/176249 A1 | 12/2012 |

OTHER PUBLICATIONS

International Preliminary Report on Patentability and English translation thereof dated Apr. 12, 2018 in connection with International Application No. PCT/JP2016/077427.

International Search Report and English translation thereof dated Dec. 13, 2016 in connection with International Application No. PCT/JP2016/077427.

U.S. Appl. No. 13/053,678, filed Mar. 22, 2011, Sakaguchi et al.
U.S. Appl. No. 15/762,120, filed Mar. 22, 2018, Tsurumi et al.
U.S. Appl. No. 15/762,206, filed Mar. 22, 2018, Eshima et al.
U.S. Appl. No. 15/762,233, filed Mar. 22, 2018, Eshima et al.

* cited by examiner

FIG.2
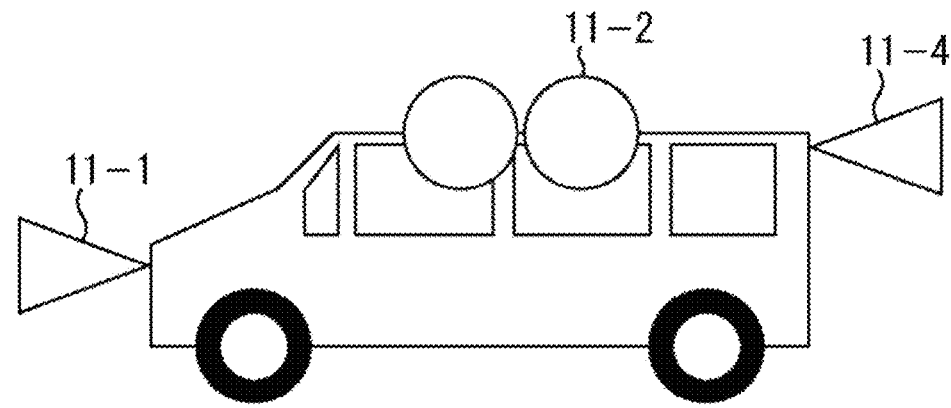
A
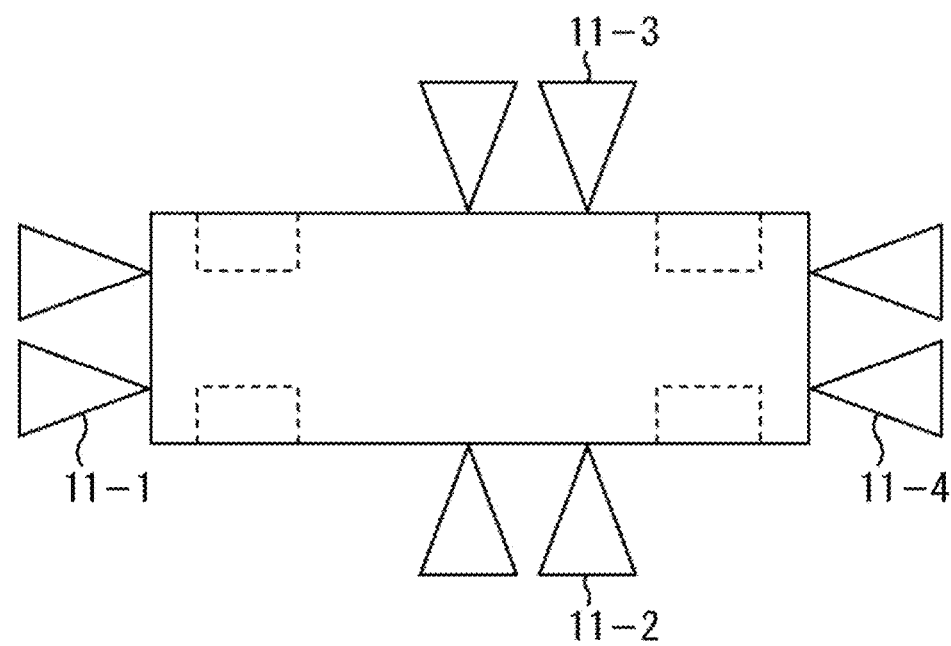
B

FIG. 5
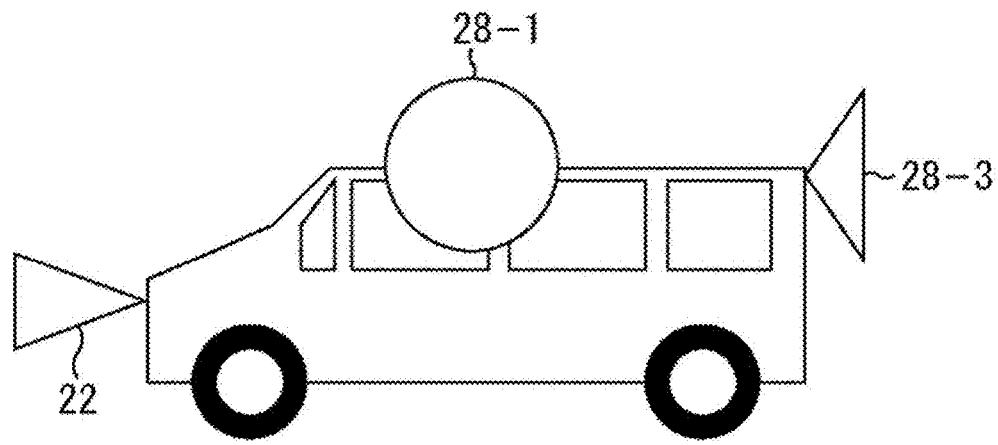
A
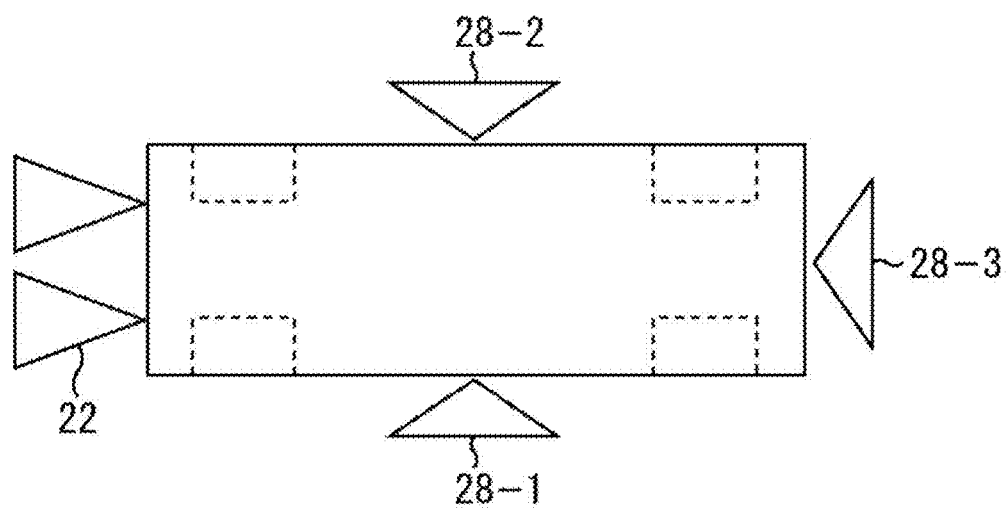
B

FIG. 6
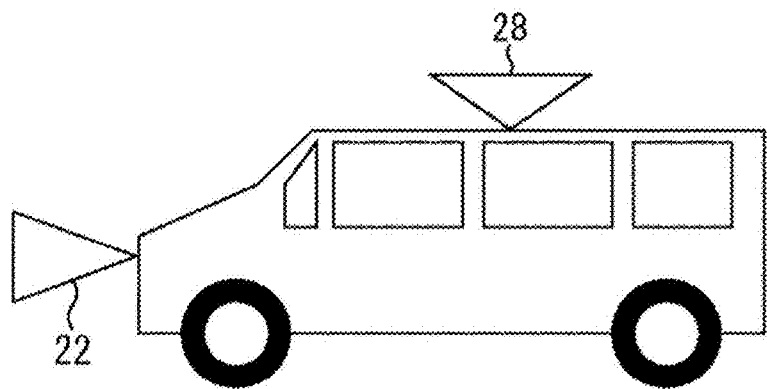
A
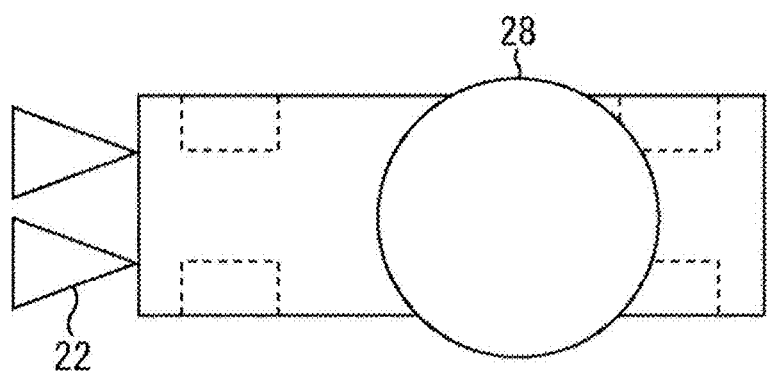
B

FIG.7
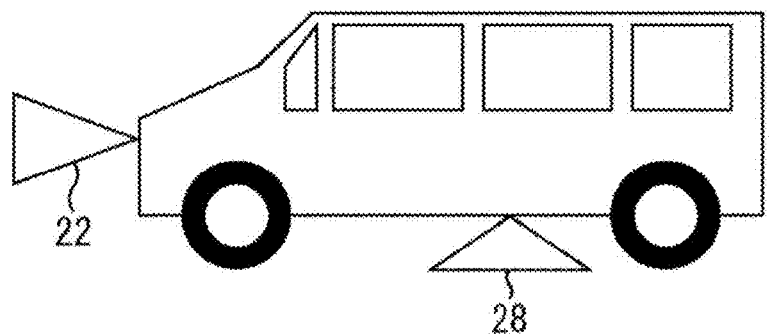
A
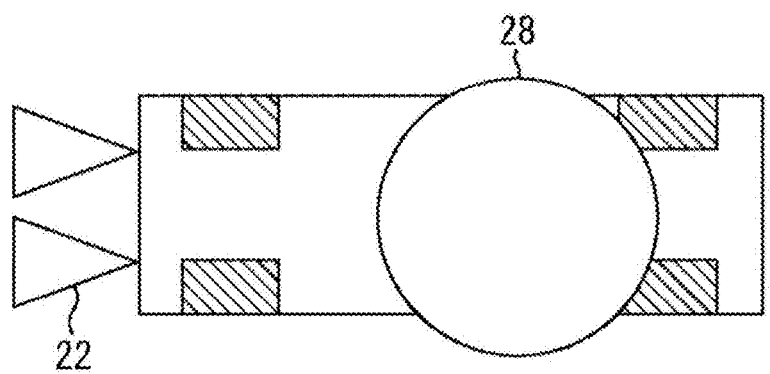
B

INFORMATION PROCESSING DEVICE, INFORMATION PROCESSING METHOD, AND PROGRAM

CROSS REFERENCE TO RELATED APPLICATIONS

This application is a U.S. National Stage entry under 35 U.S.C. 371 of International Application No. PCT/JP2016/077427, filed in the Japan Patent Office on Sep. 16, 2016, which claims priority to Patent Application No. JP2015-194554, filed in the Japan Patent Office on Sep. 30, 2015, each of which is incorporated herein by reference in its entirety.

TECHNICAL FIELD

The present disclosure relates to an information processing device, an information processing method, and a program, and more particularly to an information processing device, an information processing method, and a program suitable for estimating a self-position, mounted on a moving body such as an automobile.

BACKGROUND ART

SLAM (Simultaneous localization and mapping) is known as a technology mounted on a moving body such as an automobile to estimate a self-position of the moving body.

A self-position estimation technology based on SLAM by using a stereo camera or the like is constituted by following processes. Specifically, initially performed is a process for performing depth estimation, namely, a process for estimating 3D coordinates of feature points, on the basis of feature points detected from a texture region having a feature and detected from a pair of stereo images captured by a stereo camera as images producing a parallax difference. Subsequently performed is a process for tracking the obtained feature points in a plurality of frames, that is, a 2D coordinate tracking process for feature points. Finally performed is a process for estimating a pose (self-position and direction) which most appropriately expresses a combination of estimated 3D coordinates of feature points and tracked 2D coordinates of feature points, namely, a 6 DOF (degree-of-freedom 6) self-position (for example, see PTL 1).

CITATION LIST

Patent Literature

[PTL 1]
  JP 2008-304268A

SUMMARY

Technical Problem

The self-position estimation technology based on SLAM is constituted by the above-described processes, accordingly, self-position estimation is generally difficult to perform in a case where a major part of images captured by a stereo camera is occupied by a wall or a floor including no textures, in a case where a surrounding environment (e.g., other automobiles and pedestrians) moves, or in a case where spatial distribution of 3D coordinates of feature points are biased.

Particularly, in a case where the self-position estimation technology based on SLAM is applied to a moving body such as an automobile for outdoor use, following problems may occur to be produced difficult situations for performing self-position estimation.

More specifically, in a case where a far building is detected as a texture in the absence of a near object having a feature, for example, the detected texture does not change with time. In a case where a surrounding environment moves in an image, a distinction is difficult to make between a self-moving state and a surrounding environment moving state. In a self (automobile) high-speed moving state, feature points having disappeared from images are difficult to track.

The present disclosure developed in consideration of the aforementioned situations is capable of performing continuous estimation of a self-position.

Solution to Problem

An information processing device according to an aspect of the present disclosure includes: a main imaging unit that includes a stereo camera mounted on a moving body, and captures moving images at a predetermined frame rate to output a pair of stereo main images as time-series images; one or a plurality of sub imaging units each of which is so mounted on the moving body as to have an imaging direction different from an imaging direction of the main imaging unit, and captures moving images at a predetermined frame rate; and a final pose determination unit that estimates a pose of the moving body on the basis of the pair of stereo main images captured by the main imaging unit, and sub images captured by each of the sub imaging units.

Each of the sub imaging units may include a stereo camera, and capture moving images at a predetermined frame rate to output a pair of stereo sub images as time-series images. The final pose determination unit may include a main estimation unit that estimates a pose of the moving body on the basis of the pair of stereo main images as time-series images captured by the main imaging unit, a sub estimation unit that estimates a pose of the moving body on the basis of the pair of stereo sub images as time-series images captured by each of the sub imaging units, and an integration unit that integrates the pose estimated by the main estimation unit and the pose estimated by the sub estimation unit to determine a final pose.

The main estimation unit may estimate 3D coordinates of feature points detected from the pair of stereo main images, estimate a pose of the moving body by tracking the feature points in a plurality of frames of one of the pair of stereo main images, and output the estimated pose and reliability of the pose to the integration unit. The sub estimation unit may estimate 3D coordinates of feature points detected from the pair of stereo sub images, estimate a pose of the moving body by tracking the feature points in a plurality of frames of one of the pair of stereo sub images, and output the estimated pose and reliability of the pose to the integration unit. The integration unit may integrate, on the basis of the reliability, the pose estimated by the main estimation unit, and the pose estimated by the sub estimation unit to determine a final pose.

The reliability may include at least any one of the number of the feature points effective for estimating the pose, 3D spatial distribution of the feature points, a difference between the estimated pose and a final pose obtained immediately before, and a residual of an optimization operation performed in estimation.

Each of the sub imaging units may include a wide-angle camera, a fish-eye camera, or an omni-directional camera, and capture moving images at a predetermined frame rate to output sub images as time-series images. The final pose determination unit may include a 3D estimation unit that estimates 3D coordinates of feature points detected from the pair of stereo main images captured by the main imaging unit, a 2D tracking unit that tracks the feature points in a plurality of frames of the sub images, and converts a tracking result into 2D coordinates in the pair of stereo main images, and a pose estimation unit that estimates a final pose on the basis of the 3D coordinates of the feature points estimated by the 3D estimation unit, and the 2D coordinates of the feature points converted by the 2D tracking unit in the pair of stereo main images.

The 3D estimation unit may estimate 3D coordinates of the feature points detected from the pair of stereo main images captured by the main imaging unit, and estimate 2D coordinates of the feature points in the sub images. The 2D tracking unit may track the feature points in a plurality of frames of the sub images on the basis of the 2D coordinates of the feature points estimated by the 3D estimation unit in the sub images, and convert a tracking result into 2D coordinates in the pair of stereo main images.

The plurality of sub imaging units may be selectively switched on the basis of an estimation result of the 2D coordinates of the feature points estimated by the 3D estimation unit in the sub images to perform imaging.

An information processing method according to an aspect of the present disclosure is a method performed by an information processing device. The method performed by the information processing device includes: a final pose determination step of estimating a pose of a moving body on the basis of a pair of stereo main images captured by a main imaging unit that includes a stereo camera mounted on the moving body, and captures moving images at a predetermined frame rate to output a pair of stereo main images as time-series images, and on the basis of sub images captured by one or a plurality of sub imaging units each of which is so mounted on the moving body as to have an imaging direction different from an imaging direction of the main imaging unit, and captures moving images at a predetermined frame rate.

A program according to an aspect of the present disclosure is a program for controlling an information processing device. Under the program a computer of the information processing device executes a process including: a final pose determination step of estimating a pose of a moving body on the basis of a pair of stereo main images captured by a main imaging unit that includes a stereo camera mounted on the moving body, and captures moving images at a predetermined frame rate to output a pair of stereo main images as time-series images, and on the basis of sub images captured by one or a plurality of sub imaging units each of which is so mounted on the moving body as to have an imaging direction different from an imaging direction of the main imaging unit, and captures moving images at a predetermined frame rate.

According to an aspect of the present disclosure, a pose of a moving body is estimated on the basis of a pair of stereo main images captured by a main imaging unit that includes a stereo camera mounted on the moving body, and captures moving images at a predetermined frame rate to output a pair of stereo main images as time-series images, and on the basis of sub images captured by one or a plurality of sub imaging units each of which is so mounted on the moving body as to have an imaging direction different from an imaging direction of the main imaging unit, and captures moving images at a predetermined frame rate.

Advantageous Effect of Invention

According to an aspect of the present disclosure, continuous estimation of a self-position is achievable.

BRIEF DESCRIPTION OF DRAWINGS

FIG. 2 is a diagram illustrating an arrangement example of first through fourth imaging units illustrated in FIG. 1 in an automobile.

FIG. 5 is a diagram illustrating an arrangement example of first through third imaging units illustrated in FIG. 4 in the automobile.

FIG. 6 is a diagram illustrating an example including an arranged omni-directional camera in place of the first through third imaging units.

FIG. 7 is a diagram illustrating an example including an arranged downward camera in place of the first through third imaging units.

FIG. 12 is a conceptual diagram illustrating the information processing device applying the present disclosure and applied to creation of a 3D model, an arbitrary viewpoint video or the like.

DESCRIPTION OF EMBODIMENTS

Best modes for carrying out the present disclosure (hereinafter referred to as embodiments) are hereinafter described in detail with reference to the drawings. It is assumed in the following description that an information processing device according to the embodiments of the present disclosure is used while mounted on an automobile for outdoor use.

<First Configuration Example of Information Processing Device Applying Present Disclosure>

Figure 1:
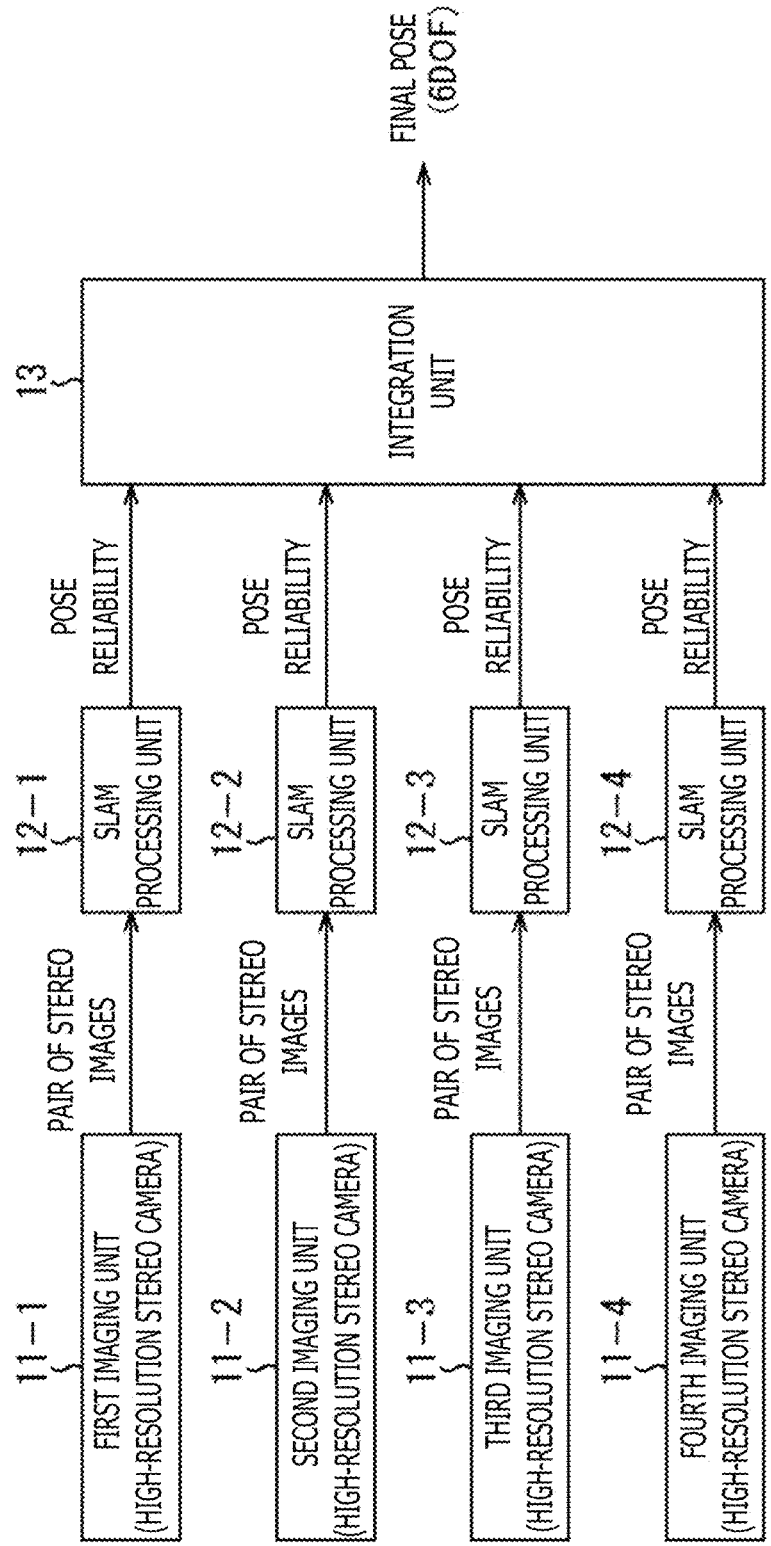
FIG. 1 is a block diagram illustrating a first configuration example of an information processing device applying the present disclosure.

FIG. 1 illustrates a first configuration example of an information processing device applying the present disclosure.

The first configuration example is constituted by first through fourth imaging units 11-1 through 11-4, SLAM processing units 12-1 through 12-4, and an integration unit 13.

The first imaging unit 11-1 is constituted by a high-resolution stereo camera which captures moving images at a predetermined frame rate, and supplies a pair of stereo images thus captured as images producing a parallax difference to the SLAM processing unit 12-1. Each of the second through fourth imaging units 11-2 through 11-4 has a configuration similar to the configuration of the first imaging unit 11-1. Note that a polarization sensor or an active system sensor (e.g., ToF sensor and SL sensor) capable of measuring a distance (3D coordinates) between a single camera and an object may be used in place of the stereo camera.

FIG. 2 illustrates an arrangement example of the first through fourth imaging units 11-1 through 11-4 in an automobile. A part A in the figure is a side view, while a part B in the figure is a top view.

The first through fourth imaging units 11-1 through 11-4 are so arranged as to have imaging ranges in directions different from each other. According to the example illustrated in the figure, the first imaging unit 11-1 is arranged on the front side of the automobile to obtain a front imaging range. The second imaging unit 11-2 is arranged on the right side of the automobile to obtain a right imaging range. The third imaging unit 11-3 is arranged on the left side of the automobile to obtain a left imaging range. The fourth imaging unit 11-4 is arranged on the rear side of the automobile to obtain a rear imaging range.

Note that the arrangements of the first through fourth imaging units 11-1 through 11-4 are not limited to the positions defined in the arrangement example in FIG. 2, but may be other positions as long as images around the automobile can be captured by a plurality of high-resolution stereo cameras. In addition, while not depicted, any one of the second through fourth imaging units 11-2 through 11-4 may be arranged on the lower part of the automobile to obtain an imaging range corresponding to a road surface.

Now return to FIG. 1. The SLAM processing unit 12-1 performs SLAM processing for a target of a pair of stereo images producing a parallax difference and sequentially supplied from the first imaging unit 11-1 at a predetermined frame rate, and outputs a pose and reliability of the pose thus obtained to the integration unit 13. The pose in this context is a 6 DOF self-position. It is assumed that the reliability includes at least one of the number of effective feature points, three-dimensional spatial parts of feature points, a difference from a final pose obtained immediately before, and a residual of an optimization operation performed in estimation.

Similarly to the SLAM processing unit 12-1, each of the SLAM processing units 12-2 through 12-4 performs SLAM processing for a target of a pair of stereo images producing a parallax difference and sequentially supplied from the preceding stage at a predetermined frame rate, and outputs a pose and reliability of the pose thus obtained to the integration unit 13.

Note that a part or the whole of SLAM processing performed by the SLAM processing units 12-1 through 12-4 may be executed by, i.e., a server in a cloud.

The integration unit 13 integrates poses input from the SLAM processing units 12-1 through 12-4 on the basis of reliability of each pose to determine a final pose. More specifically, the integration unit 13 calculates a weighted average of poses input from the SLAM processing units 12-1 through 12-4 on the basis of reliability of each pose, selects a pose having the highest reliability, or integrates poses input from the SLAM processing units 12-1 through 12-4 using Kalman filter based on reliability of each pose to determine a final pose.

<Final Pose Determination Process by First Configuration Example of Information Processing Device>

Figure 3:
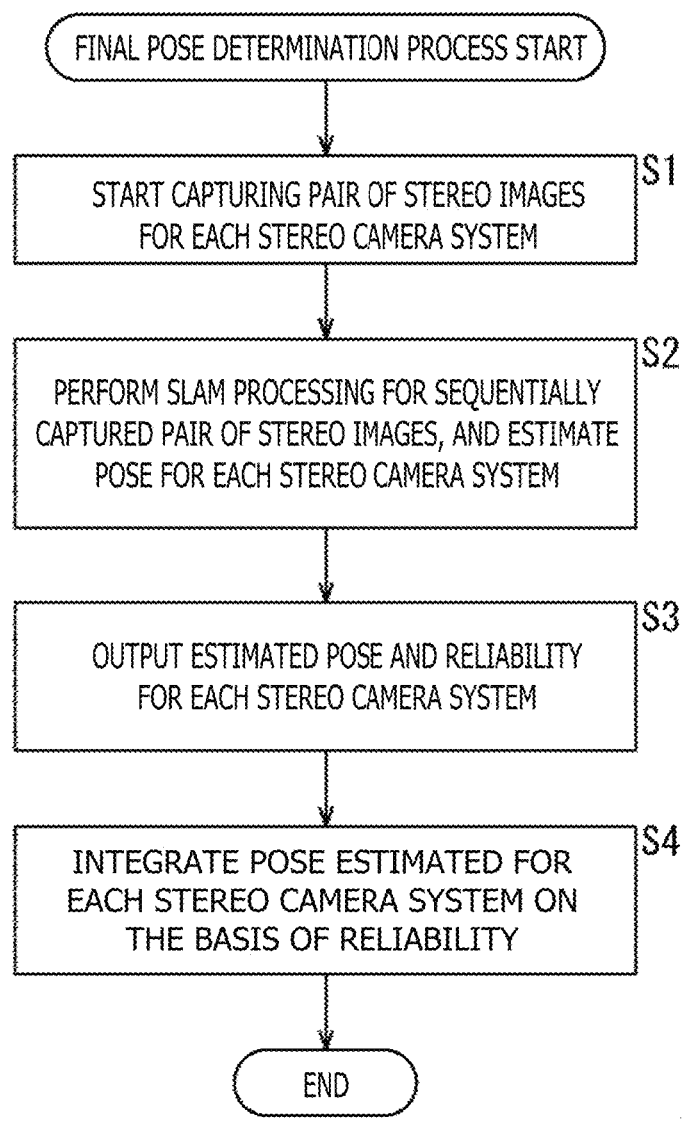
FIG. 3 is a flowchart illustrating a final pose determination process performed by the first configuration example of the information processing device.

Next, FIG. 3 illustrates a flowchart of a final pose determination process performed by the first configuration example of the information processing device.

Each of combinations of the first through fourth imaging units 11-1 through 11-4 and the corresponding SLAM processing units 12-1 through 12-4 is hereinafter referred to as a stereo camera system. In addition, each of the first through fourth imaging units 11-1 through 11-4 is referred to as an imaging unit 11 in a case where no distinction between the first through fourth imaging units 11-1 through 11-4 is needed. Similarly, each of the SLAM processing units 12-1 through 12-4 is referred to as a SLAM processing unit 12 in a case where no distinction between the first through fourth SLAM processing units 12-1 through 12-4 is needed.

In step S1, the imaging unit 11 of each stereo camera system starts capturing of moving images at a predetermined frame rate, and supplies a pair of stereo images thus captured as images producing a parallax difference to the SLAM processing unit 12 as a processing target.

In step S2, the SLAM processing unit 12 of each stereo camera system performs SLAM processing for a target of a pair of stereo images producing a parallax difference and sequentially supplied from the preceding stage of the imaging unit 11 at a predetermined frame rate. In step S3, the SLAM processing unit 12 outputs a pose and reliability of the pose thus obtained to the integration unit 13.

In step S4, the integration unit 13 integrates the poses input from the SLAM processing units 12 of the respective stereo camera systems on the basis of reliability of each pose to determine a final pose. More specifically, any one of the three types of integration methods described above may be adopted.

According to the final pose determination process described herein, all the stereo camera systems estimate a self-position, and integrate estimation results thus obtained. Accordingly, continuous estimation of a final pose is achievable even in a case where one of the stereo camera systems is unable to perform self-position estimation or produces errors.

Note that the number of the provided stereo camera systems is not limited to four, but may be any number equal to or larger than two. Needless to say, accuracy of a final pose increases as the number of the provided stereo camera systems increases.

<Second Configuration Example of Information Processing Device Applying Present Disclosure>

Figure 4:
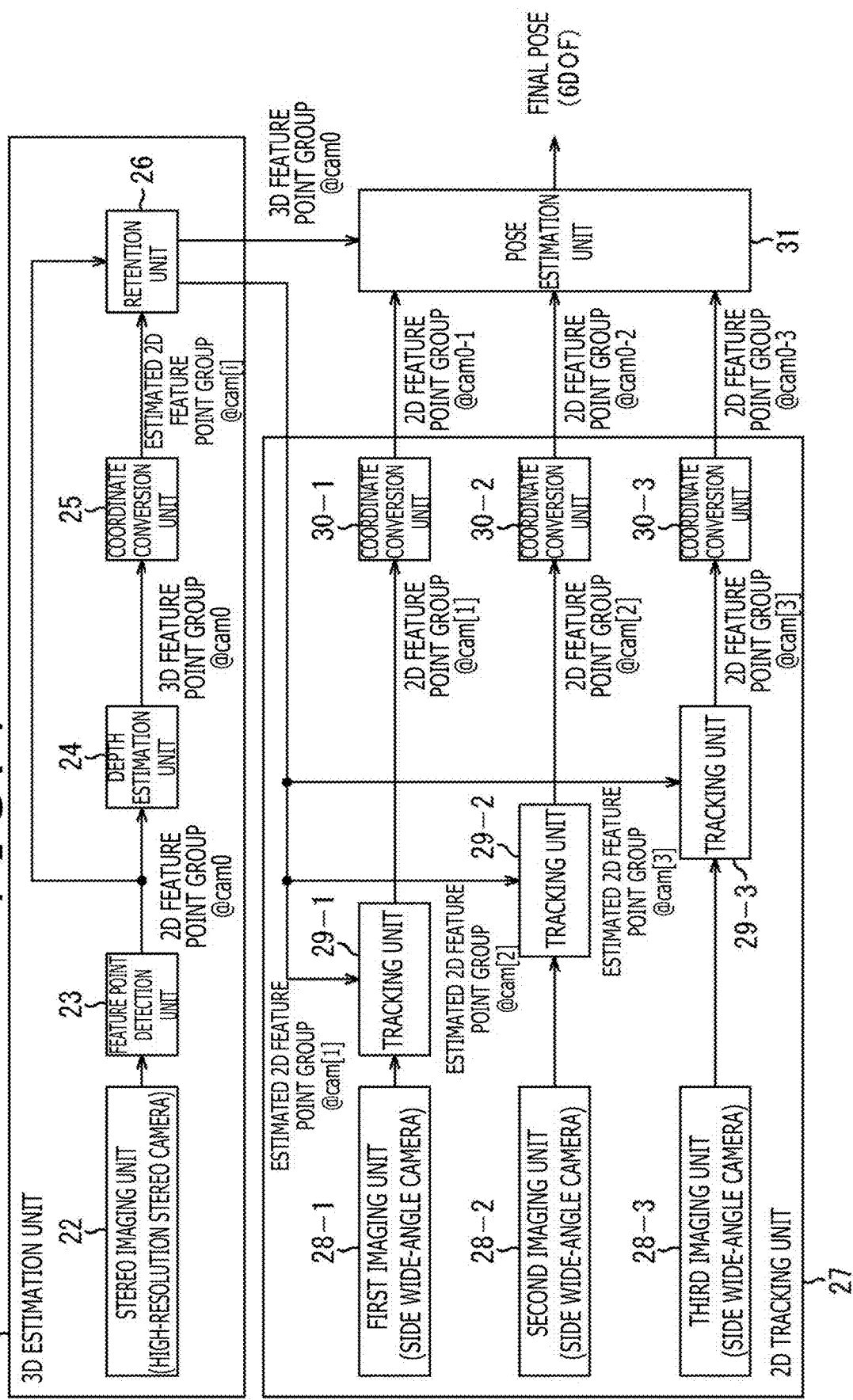
FIG. 4 is a block diagram illustrating a second configuration example of the information processing device applying the present disclosure.

FIG. 4 illustrates a second configuration example of the information processing device applying the present disclosure.

The second configuration example is roughly constituted by a 3D estimation unit 21, a 2D tracking unit 27, and a pose estimation unit 31.

The 3D estimation unit 21 includes a stereo imaging unit 22, a feature point detection unit 23, a depth estimation unit 24, a coordinate conversion unit 25, and a retention unit 26.

The stereo imaging unit 22 is constituted by a high-resolution stereo camera which captures an image of the front of the automobile. The stereo imaging unit 22 captures moving images at a predetermined frame rate, and supplies a pair of stereo images thus captured as images producing a parallax difference to the feature point detection unit 23.

The feature point detection unit 23 detects a texture region having a feature from each of the pair of stereo images supplied from the stereo imaging unit 22, detects one or more feature points from the texture region, and outputs a 2D feature point group @cam0 indicating a detection result to the depth estimation unit 24.

The depth estimation unit 24 performs a process for depth estimation of the feature points in the pair of stereo images, namely, a process for estimating 3D coordinates of the feature points, and outputs a 3D feature point group @cam0 indicating a processing result to the coordinate conversion unit 25 and the retention unit 26.

The coordinate conversion unit 25 estimates 2D coordinates of the feature points, which have been detected from the pair of stereo images, in a first image captured by a first imaging unit 28-1 (described below) on the basis of the 3D feature point group @cam0 obtained from the depth estimation unit 24, and outputs an estimated 2D feature point group @cam[1] thus obtained to the retention unit 26. Moreover, the coordinate conversion unit 25 estimates 2D coordinates of the feature points, which have been detected from the pair of stereo images, in a second image captured by a second imaging unit 28-2 (described below) on the basis of the 3D feature point group @cam0 obtained from the depth estimation unit 24, and outputs an estimated 2D feature point group @cam[2] thus obtained to the retention unit 26. Furthermore, the coordinate conversion unit 25 estimates 2D coordinates of the feature points, which have been detected from the pair of stereo images, in a third image captured by a third imaging unit 28-3 (described below) on the basis of the 3D feature point group @cam0 obtained from the depth estimation unit 24, and outputs an estimated 2D feature point group @cam[3] thus obtained to the retention unit 26.

The retention unit 26 retains the 3D feature point group @cam0 input from the depth estimation unit 24, and the estimated 2D feature point group @cam[i] (i=1, 2, 3) input from the coordinate conversion unit 25.

The 2D tracking unit 27 includes the first through third imaging units 28-1 through 28-3, tracking units 29-1 through 29-3, and coordinate conversion units 30-1 through 30-3.

The first imaging unit 28-1 is constituted by a camera having a wide imaging range, such as a wide-angle camera and a fish-eye camera. The first imaging unit 28-1 captures moving images at a predetermined frame rate, and supplies a first image thus obtained to a tracking feature point detection unit 23-1. Similarly, the second imaging unit 28-2 supplies a second image to a tracking feature point detection unit 23-2, while the third imaging unit 28-3 supplies a third image to a tracking feature point detection unit 23-3. As described above, each of the first through third imaging units 28-1 through 28-3 is constituted not by a stereo camera which requires calibration based on parallax, but by a single wide-angle camera or the like. In this case, more reduction of costs, and reduction of labor and time for calibration are achievable than a structure including a stereo camera.

Note that the direction and zooming rate of the high-resolution stereo camera constituting the stereo imaging unit 22 may be controlled within an effective texture range selected from the first through third images captured by the first through third imaging units 28-1 through 28-3.

FIG. 5 illustrates an arrangement example of the first through third imaging units 28-1 through 28-3 in the automobile.

As illustrated in the figure, the first imaging unit 28-1 is attached to a position to obtain an imaging range corresponding to the left side of the automobile, for example. The second imaging unit 28-2 is attached to a position to obtain an imaging range corresponding to the right side of the automobile, for example. The third imaging unit 28-3 is attached to a position to obtain an imaging range corresponding to the rear side of the automobile, for example.

Note that imaging may be performed while selectively switching the first through third imaging units 28-1 through 28-3, rather than simultaneous imaging performed by all the first through third imaging units 28-1 through 28-3 at a time. More specifically, selection may be so made as to produce no bias of spatial distribution of feature points detected from the pair of stereo images (particularly distribution in depth direction), capture images including no moving surrounding environment, or capture images including effective textures as feature points. Selection in these manners can achieve power saving.

In addition, as illustrated in FIG. 6, an omni-directional camera 28 having an imaging range around the automobile through 360 degrees may be arranged on the roof or the like of the automobile, in place of the first through third imaging units 28-1 through 28-3. Alternatively, as illustrated in FIG. 7, a downward camera 28 having an imaging range corresponding to a road surface may be arranged on the bottom or the like of the automobile, in place of the first through third imaging units 28-1 through 28-3.

Now return to FIG. 4. The tracking unit 29-1 obtains the estimated 2D feature point group @cam[1] from the retention unit 26, tracks the feature points detected from the pair of stereo images in the first image obtained from the first imaging unit 28-1 on the basis of the obtained estimated 2D feature point group @cam[1], and outputs the 2D feature point group @cam[1] thus obtained to the coordinate conversion unit 30-1. Note that feature points included in the feature points detected from the pair of stereo images and not present in the first image are deleted from the 2D feature point group @cam[1]. Similarly, the tracking unit 29-2 outputs the 2D feature point group @cam[2] to the coordinate conversion unit 30-2, while the tracking unit 29-3 outputs the 2D feature point group @cam[3] to the coordinate conversion unit 30-3.

The coordinate conversion unit 30-1 converts 2D coordinates of the feature points tracked in the first image into 2D coordinates in the pair of stereo images on the basis of the 2D feature point group @cam[1] input from the tracking unit 29-1, and outputs a 2D feature point group @cam0-1 thus obtained to the pose estimation unit 31. Similarly, the coordinate conversion unit 30-2 outputs a D feature point group @cam0-2 to the pose estimation unit 31, while the coordinate conversion unit 30-3 outputs a D feature point group @cam0-3 to the pose estimation unit 31.

The pose estimation unit 31 obtains the 3D feature point group @cam0 from the retention unit 26, and estimates a final pose (6 DOF) which most appropriately expresses a combination of 3D coordinates and 2D coordinates on the basis of the obtained 3D feature point group @cam0, and 2D feature point group @cam0-1 through 2D feature point group @cam0-3.

<Final Pose Determination Process by Second Configuration Example of Information Processing Device>

Figure 8:
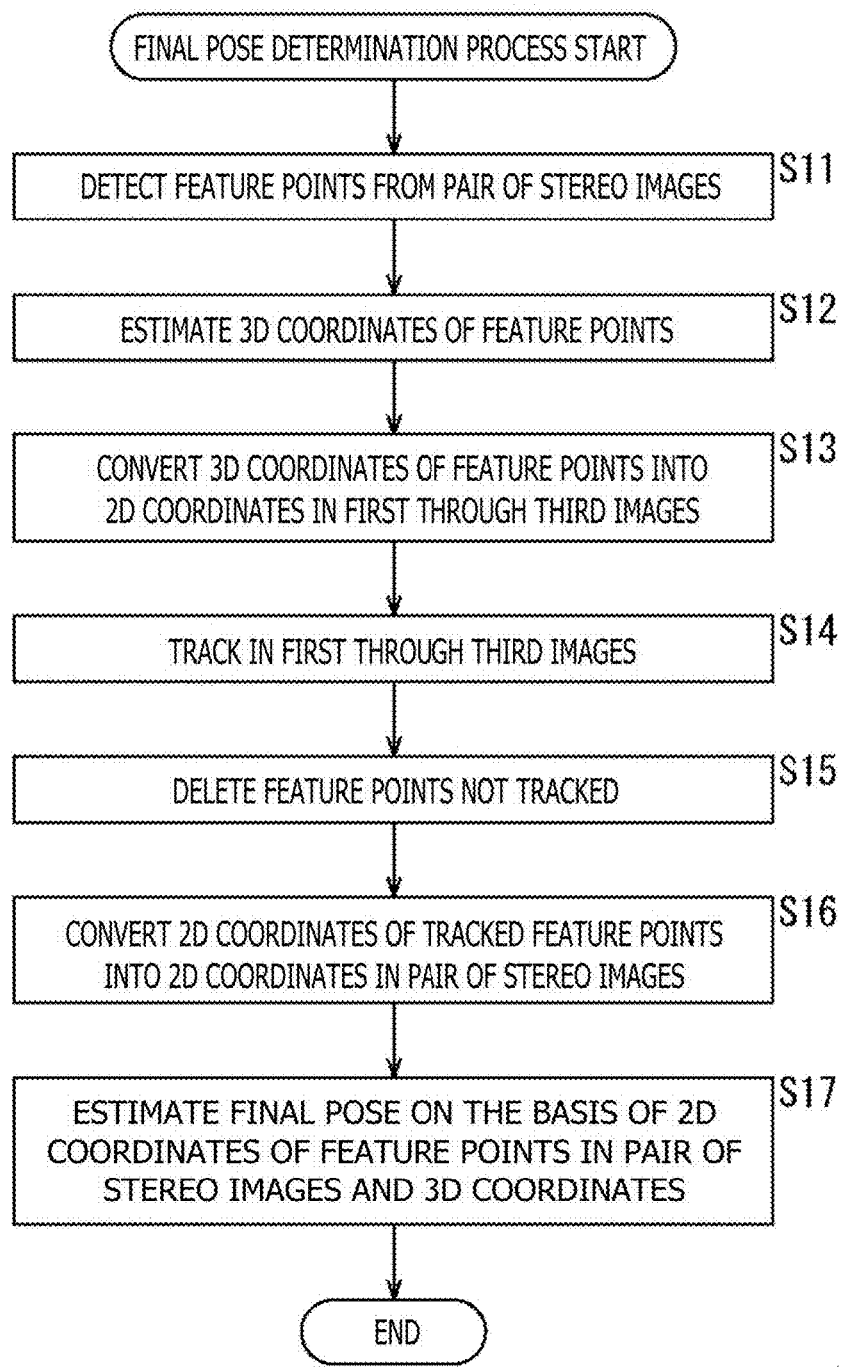
FIG. 8 is a flowchart illustrating a final pose determination process performed by the second configuration example of the information processing device.

Next, FIG. 8 illustrates a flowchart of a final pose determination process performed by the second configuration example of the information processing device.

It is assumed that the stereo imaging unit 22 has already started capturing of moving images at a predetermined frame rate, and output a pair of stereo images thus obtained to the subsequent stage.

In step S11, the feature point detection unit 23 of the 3D estimation unit 21 detects a texture region having a feature from each of the pair of stereo images, detects one or more feature points from the texture region, and outputs the 2D feature point group @cam0 indicating a detection result to the depth estimation unit 24. In step S12, the depth estimation unit 24 estimates 3D coordinates of the feature points in the pair of stereo images, and outputs the 3D feature point group @cam0 indicating a result of estimation to the coordinate conversion unit 25 and the retention unit 26.

In step S13, the coordinate conversion unit 25 estimates 2D coordinates of the feature points, which have been detected from the pair of stereo images, in each of the first through third images on the basis of the 3D feature point group @cam0, and outputs the estimated 2D feature point group @cam[i] (i=1, 2, 3) thus obtained to the retention unit 26.

Thereafter, the first through third imaging units 28-1 through 28-3 of the 2D tracking unit 27 are selectively switched to start capturing of moving images by the selected imaging unit.

In step S14, the tracking unit 29-$i$ (i=1, 2, 3) obtains the estimated 2D feature point group @cam[i] from the retention unit 26, and tracks the feature points detected from the pair of stereo images in the ith image obtained from the preceding stage on the basis of the obtained estimated 2D feature point group @cam[i] to obtain the 2D feature point group @cam[i]. In subsequent step S15, the tracking unit 29-$i$ deletes recording of the feature points not tracked in the ith image from the 2D feature point group @cam[i], and outputs the resultant 2D feature point group @cam[i] to the coordinate conversion unit 30-$i$.

In step S16, the coordinate conversion unit 30-$i$ (i=1, 2, 3) converts 2D coordinates of the feature points tracked in the ith image into 2D coordinates in the pair of stereo images on the basis of the 2D feature point group @cam[i] input from the tracking unit 29-$i$, and outputs the 2D feature point group @cam0-i thus obtained to the pose estimation unit 31.

In step S17, the pose estimation unit 31 obtains the 3D feature point group @cam0 from the retention unit 26, and estimates a final pose (6 DOF) which most appropriately expresses a combination of 3D coordinates and 2D coordinates on the basis of the obtained 3D feature point group @cam0, and 2D feature point group @cam0-1 through 2D feature point group @cam0-3.

According to the final pose determination process performed by the second configuration example of the information processing device described herein, the first through third imaging units 28-1 through 28-3 are selectively switched, more specifically, one of the imaging units 28-1 through 28-3 is selected such that continuous tracking of feature points detected from a pair of stereo images can be achieved, that no bias of spatial distribution of feature points is produced, and that feature points not affected by a surrounding environment can be detected. Accordingly, continuous estimation of a final pose is achievable.

<Application Examples of Information Processing Device Applying Present Disclosure>

While application to in-vehicle devices has been presented in the embodiment described herein, the first and second configuration examples of the information processing device may be applied to purposes other than in-vehicle devices.

Figure 9:
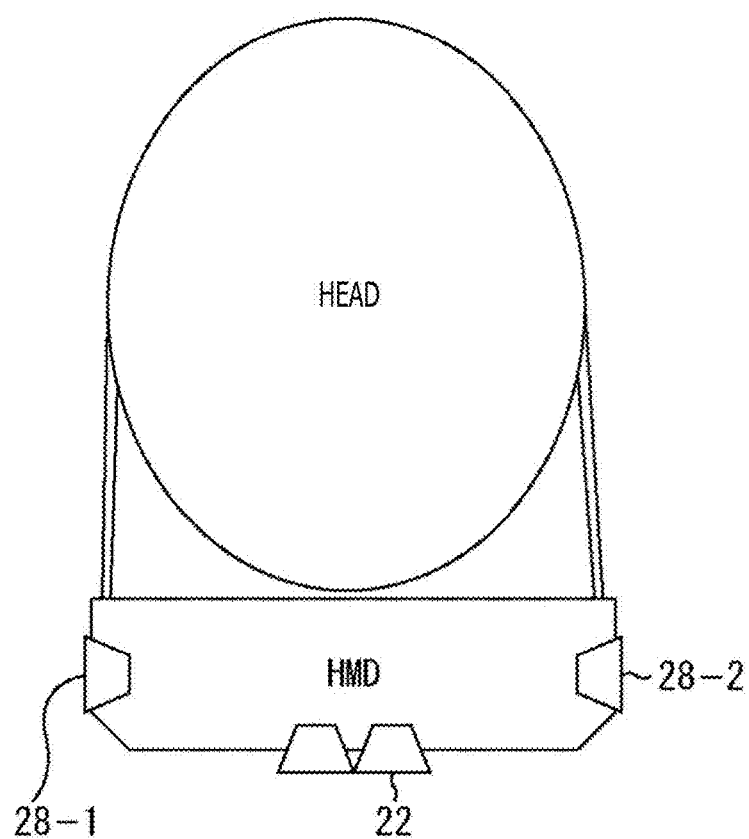
FIG. 9 is a conceptual diagram illustrating the information processing device applying the present disclosure and mounted on a head mounted display.

FIG. 9 is a conceptual diagram illustrating the second configuration example of the information processing device mounted on a head mounted display (HMD).

The HMD illustrated in the figure achieves continuous estimation of position and posture of the head of a user, thereby presenting a video corresponding to a state of the user for video reproduction and AR or VR application.

Figure 10:
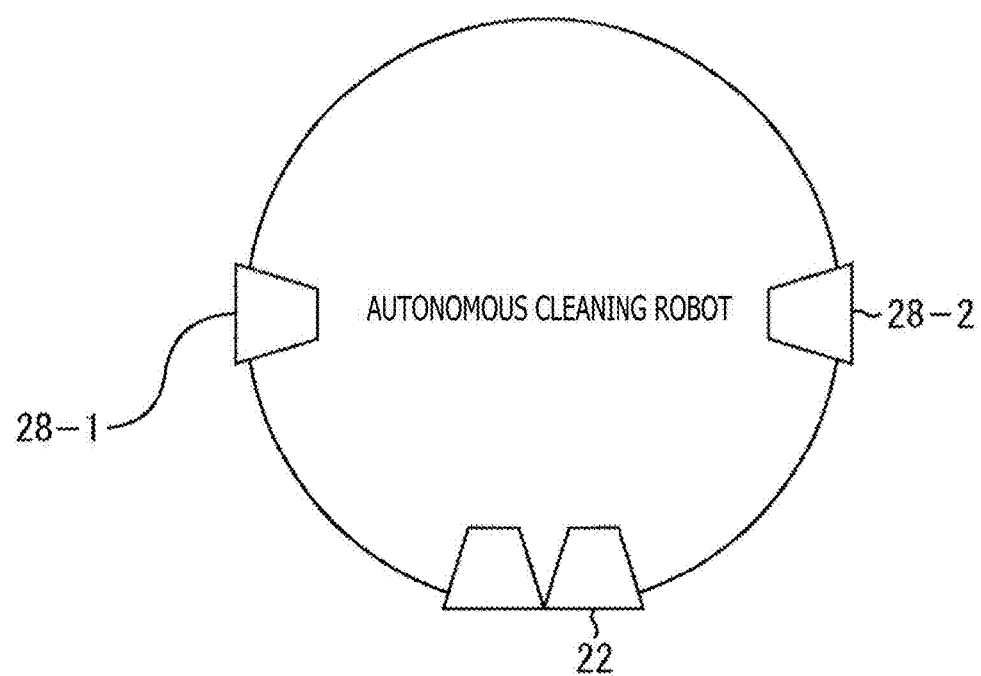
FIG. 10 is a conceptual diagram illustrating the information processing device applying the present disclosure and mounted on an autonomous cleaning robot.
Figure 11:
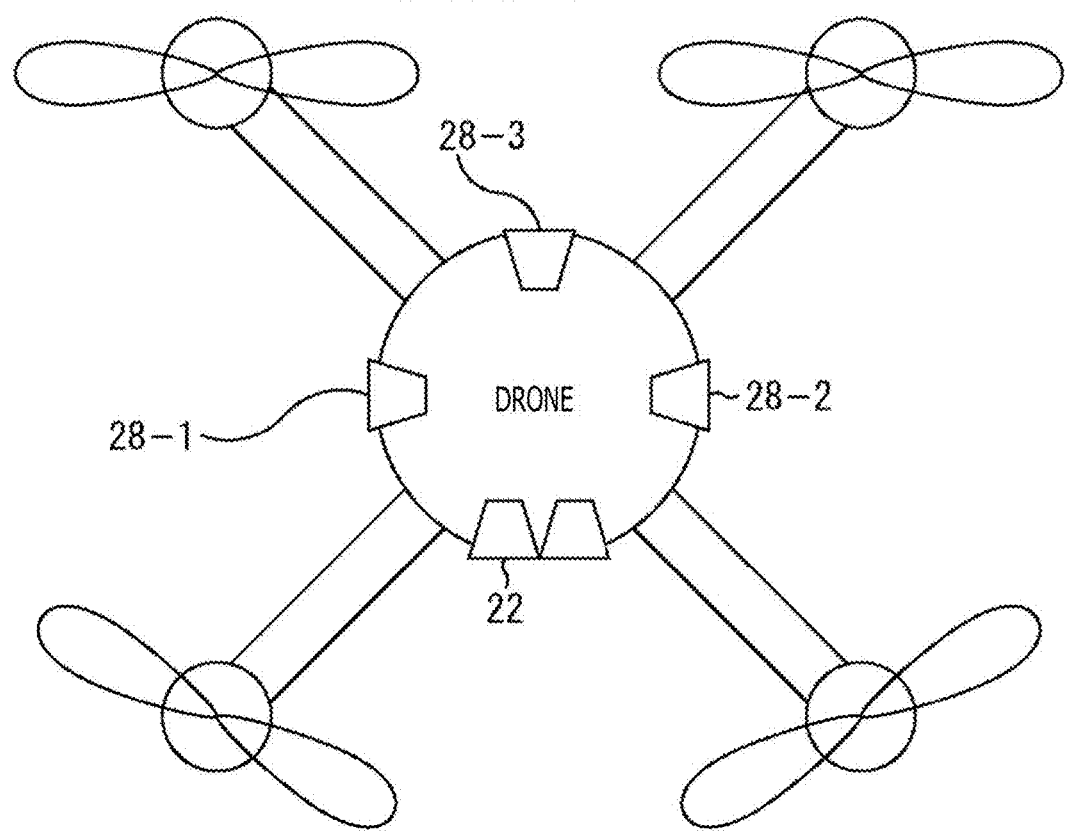
FIG. 11 is a conceptual diagram illustrating the information processing device applying the present disclosure and mounted on a drone (autonomous unmanned aerial vehicle).

FIG. 10 is a conceptual diagram illustrating the second configuration example of the information processing device mounted on an autonomous cleaning robot. FIG. 11 is a conceptual diagram illustrating the second configuration example of the information processing device mounted on a drone (autonomous unmanned aerial vehicle).

The autonomous cleaning robot illustrated in FIG. 10 and the drone illustrated in FIG. 11 achieve continuous and stable estimation of a self-pose, thereby increasing stability of movement or flight.

While not depicted, the information processing device may be miniaturized and attached to a wild animal or the like requiring protection to continuously estimate a position of the animal or the like. Accordingly, the information processing device thus configured contributes to behavior analysis of the animal or the like.

Figure 12:
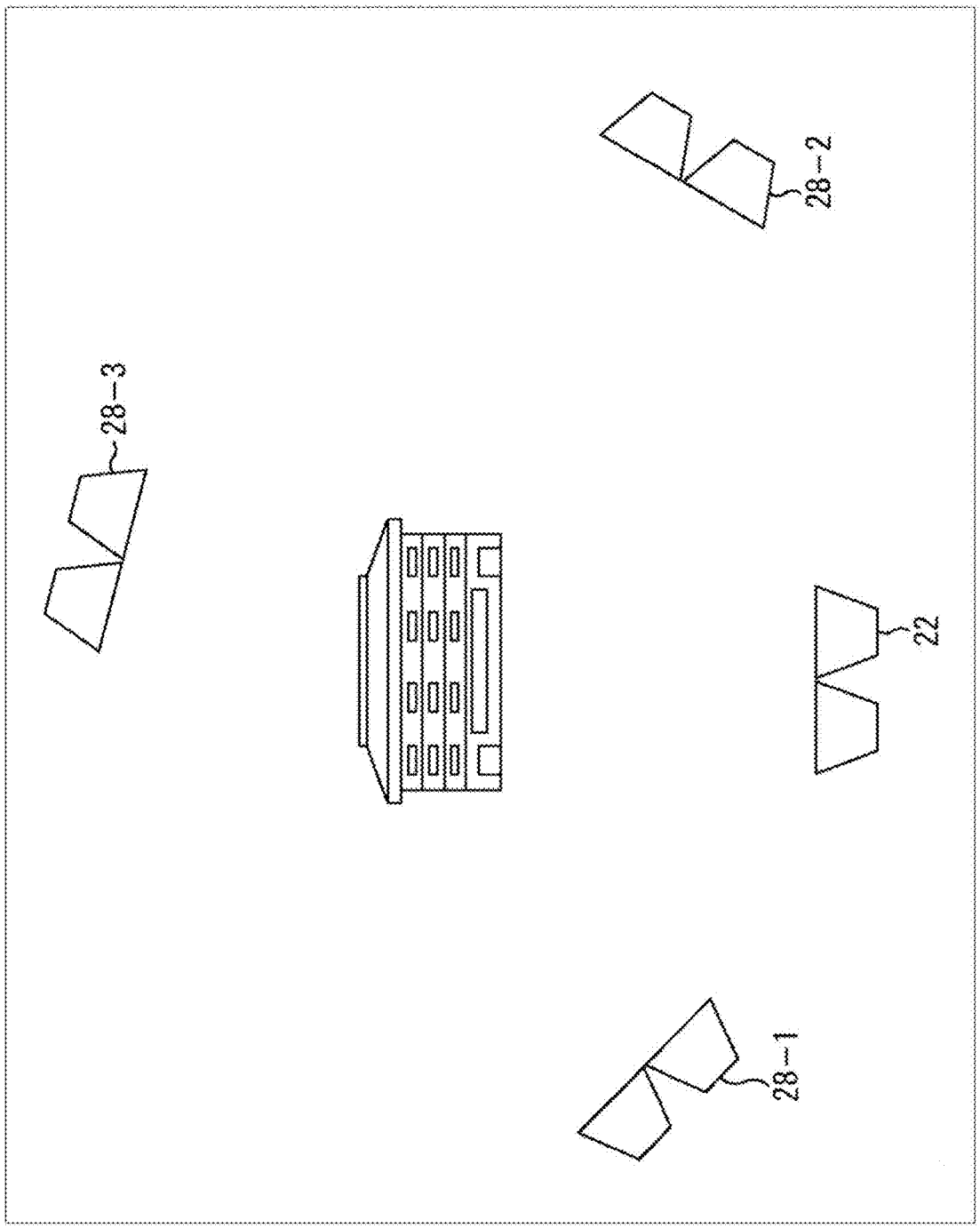

FIG. 12 is a conceptual diagram illustrating the second configuration example of the information processing device applied to creation of a 3D model or an arbitrary viewpoint video. As illustrated in the figure, the respective imaging units may be arranged around an immovable object (building in the example of the figure) to estimate positions and postures of the respective imaging units. Accordingly, creation of a 3D model or an arbitrary viewpoint video is achievable by using images captured by the respective imaging units.

While the first and second configuration examples of the information processing device have been described as above, a series of processes performed by the first and second configuration examples may be executed by either hardware or hardware. In a case where the series of processes are executed by software, programs constituting the software are installed in a computer. Examples of the computer in this context include a computer incorporated in dedicated hardware, and a general-purpose personal computer in which various programs are installed to execute various functions.

Figure 13:
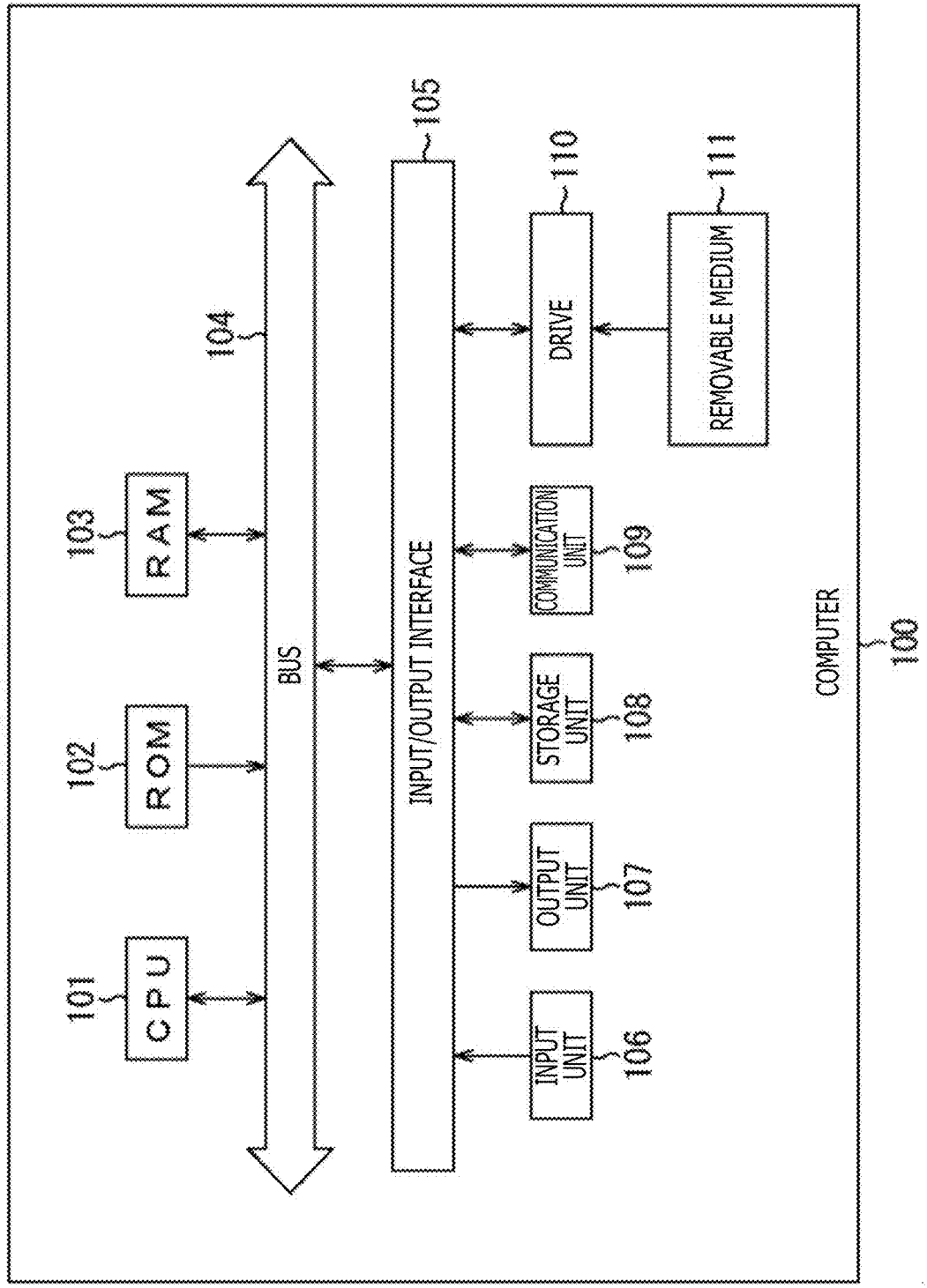
FIG. 13 is a block diagram illustrating a configuration example of a general-purpose computer.

FIG. 13 is a block diagram illustrating a configuration example of hardware of a computer which executes the series of processes described above under programs.

A CPU (Central Processing Unit) 101, a ROM (Read Only Memory) 102, and a RAM (Random Access Memory) 103 included in a computer 100 illustrated in the figure are connected to one another via a bus 104.

An input/output interface 105 is further connected to the bus 104. An input unit 106, an output unit 107, a storage unit 108, a communication unit 109, and a drive 110 are connected to the input/output interface 105.

The input unit 106 is constituted by a keyboard, a mouse, a microphone or the like. The output unit 107 is constituted by a display, a speaker or the like. The storage unit 108 is constituted by a hard disk, a non-volatile memory or the like. The communication unit 109 is constituted by a network interface or the like. The drive 110 drives a removable medium 111 such as a magnetic disk, an optical disk, a magneto-optical disk, and a semiconductor memory.

According to the computer 100 configured as above, programs stored in the storage unit 108 are loaded to the RAM 103 via the input/output interface 105 and the bus 104 and executed by the CPU 101 to perform the series of processes described above, for example.

Note that the programs executed by the computer 100 may be programs under which time-series processes are performed in the order described in the present specification, or may be programs under which processes are performed in parallel or at necessary timing such as an occasion of a call.

Note that embodiments according to the present disclosure is not limited to the specific embodiments described herein, but may be modified in various ways without departing from the scope of the subject matters of the present disclosure.

The present disclosure may also have following configurations.

(1)

An information processing device including:

a main imaging unit that includes a stereo camera mounted on a moving body, and captures moving images at a predetermined frame rate to output a pair of stereo main images as time-series images;

one or a plurality of sub imaging units each of which is so mounted on the moving body as to have an imaging direction different from an imaging direction of the main imaging unit, and captures moving images at a predetermined frame rate; and a final pose determination unit that estimates a pose of the moving body on the basis of the pair of stereo main images captured by the main imaging unit, and sub images captured by each of the sub imaging units.

(2)

The information processing device according to (1) described above, in which each of the sub imaging units includes a stereo camera, and captures moving images at a predetermined frame rate to output a pair of stereo sub images as time-series images, and the final pose determination unit includes a main estimation unit that estimates a pose of the moving body on the basis of the pair of stereo main images as time-series images captured by the main imaging unit, a sub estimation unit that estimates a pose of the moving body on the basis of the pair of stereo sub images as time-series images captured by each of the sub imaging units, and an integration unit that integrates the pose estimated by the main estimation unit and the pose estimated by the sub estimation unit to determine a final pose.

(3)

The information processing device according to (2) described above, in which the main estimation unit estimates 3D coordinates of feature points detected from the pair of stereo main images, estimates a pose of the moving body by tracking the feature points in a plurality of frames of one of the pair of stereo main images, and outputs the estimated pose and reliability of the pose to the integration unit, the sub estimation unit estimates 3D coordinates of feature points detected from the pair of stereo sub images, estimates a pose of the moving body by tracking the feature points in a plurality of frames of one of the pair of stereo sub images, and outputs the estimated pose and reliability of the pose to the integration unit, and the integration unit integrates, on the basis of the reliability, the pose estimated by the main estimation unit, and the pose estimated by the sub estimation unit to determine a final pose.

(4)

The information processing device according to (3) described above, in which the reliability includes at least any one of the number of the feature points effective for estimating the pose, 3D spatial distribution of the feature points, a difference between the estimated pose and a final pose obtained immediately before, and a residual of an optimization operation performed in estimation.

(5)

The information processing device according to (1) described above, in which each of the sub imaging units includes a wide-angle camera, a fish-eye camera, or an omni-directional camera, and captures moving images at a predetermined frame rate to output sub images as time-series images, and the final pose determination unit includes a 3D estimation unit that estimates 3D coordinates of feature points detected from the pair of stereo main images captured by the main imaging unit, a 2D tracking unit that tracks the feature points in a plurality of frames of the sub images, and converts a tracking result into 2D coordinates in the pair of stereo main images, and a pose estimation unit that estimates a final pose on the basis of the 3D coordinates of the feature points estimated by the 3D estimation unit, and the 2D coordinates of the feature points converted by the 2D tracking unit in the pair of stereo main images.

(6)

The information processing device according to (5) described above, in which the 3D estimation unit estimates 3D coordinates of the feature points detected from the pair of stereo main images captured by the main imaging unit, and estimates 2D coordinates of the feature points in the sub images, and the 2D tracking unit tracks the feature points in a plurality of frames of the sub images on the basis of the 2D coordinates of the feature points estimated by the 3D estimation unit in the sub images, and converts a tracking result into 2D coordinates in the pair of stereo main images.

(7)

The information processing device according to (5) or (6) described above, in which the plurality of sub imaging units are selectively switched on the basis of an estimation result of the 2D coordinates of the feature points estimated by the 3D estimation unit in the sub images to perform imaging.

(8)

An information processing method for an information processing device, the method performed by the information processing device and including:

a final pose determination step of estimating a pose of a moving body on the basis of a pair of stereo main images captured by a main imaging unit that includes a stereo camera mounted on the moving body, and captures moving images at a predetermined frame rate to output a pair of stereo main images as time-series images, and on the basis of sub images captured by one or a plurality of sub imaging units each of which is so mounted on the moving body as to have an imaging direction different from an imaging direction of the main imaging unit, and captures moving images at a predetermined frame rate.

(9)

A program for controlling an information processing device, under the program a computer of the information processing device executes a process including:

a final pose determination step of estimating a pose of a moving body on the basis of a pair of stereo main images captured by a main imaging unit that includes a stereo camera mounted on the moving body, and captures moving images at a predetermined frame rate to output a pair of stereo main images as time-series images, and on the basis of sub images captured by one or a plurality of sub imaging units each of which is so mounted on the moving body as to have an imaging direction different from an imaging direction of the main imaging unit, and captures moving images at a predetermined frame rate.

REFERENCE SIGNS LIST 11-1 First imaging unit
11-2 Second imaging unit
11-3 Third imaging unit
11-4 Fourth imaging unit
12-1 through 12-4 SLAM processing unit
13 Integration unit
21 3D estimation unit
22 Stereo imaging unit
23 Feature point detection unit
24 Depth estimation unit
25 Coordinate conversion unit
26 Retention unit
27 2D tracking unit
28-1 First imaging unit
28-2 Second imaging unit
28-3 Third imaging unit
29-1 through 29-3 Tracking unit
30-1 through 30-3 Coordinate conversion unit
31 Pose estimation unit
100 Computer
101 CPU

The invention claimed is:

1. An information processing device comprising:
circuitry configured to function as:
   a main imaging unit that includes a stereo camera mounted on a moving body, and that captures moving images at a predetermined frame rate to output a pair of stereo main images as time-series images;
   a plurality of sub imaging units each of which is so mounted on the moving body as to have an imaging direction different from an imaging direction of the main imaging unit, and each of which captures moving sub images at a predetermined frame rate; and
   a final pose determination unit that estimates a pose of the moving body based on the pair of stereo main images captured by the main imaging unit, and the moving sub images captured by each of the sub imaging units,
   wherein the sub imaging units are selectively switched to start performing imaging based on an estimation result of the final pose determination unit, such that feature points of the pair of stereo images are continuously tracked without requiring simultaneous imaging by all of the sub imaging units,
   wherein each of the sub imaging units includes a stereo camera, and captures moving images at a predetermined frame rate to output a pair of stereo sub images as time-series images, and
   wherein the final pose determination unit includes
      a main estimation unit that estimates a pose of the moving body based on the pair of stereo main images as time-series images captured by the main imaging unit,
      a sub estimation unit that estimates a pose of the moving body based on the pair of stereo sub images as time-series images captured by each of the sub imaging units, and
      an integration unit that integrates the pose estimated by the main estimation unit and the pose estimated by the sub estimation unit to determine a final pose.

2. The information processing device according to claim 1, wherein
   the main estimation unit estimates 3D coordinates of the feature points detected from the pair of stereo main images, estimates the pose of the moving body by tracking the feature points in a plurality of frames of one of the pair of stereo main images, and outputs the estimated pose and a reliability of the estimated pose to the integration unit,
   the sub estimation unit estimates 3D coordinates of the feature points detected from the pair of stereo sub images, estimates the pose of the moving body by tracking the feature points in a plurality of frames of one of the pair of stereo sub images, and outputs the estimated pose and a reliability of the estimated pose to the integration unit, and
   the integration unit integrates, based on the reliability outputted by the main estimation unit, the reliability outputted by the sub estimation unit, the pose estimated by the main estimation unit, and the pose estimated by the sub estimation unit to determine the final pose.

3. The information processing device according to claim 2, wherein, for each of the main estimation unit and the sub estimation unit, the reliability includes at least any one of the feature points effective for estimating the pose, 3D spatial distribution of the feature points, a difference between the estimated pose and a previous final pose obtained immediately before, and a residual of an optimization operation performed in estimation.

4. The information processing device according to claim 1, wherein
   each of the sub imaging units includes a wide-angle camera, a fish-eye camera, or an omni-directional camera, and captures the moving sub images at the predetermined frame rate to output the moving sub images as time-series images, and
   the final pose determination unit includes
      a 3D estimation unit that estimates 3D coordinates of the feature points detected from the pair of stereo main images captured by the main imaging unit,
      a 2D tracking unit that tracks the feature points in a plurality of frames of the moving sub images, and converts a tracking result into 2D coordinates in the pair of stereo main images, and
      a pose estimation unit that estimates the final pose based on the 3D coordinates of the feature points estimated by the 3D estimation unit, and the 2D coordinates of the feature points converted by the 2D tracking unit in the pair of stereo main images.

5. The information processing device according to claim 4, wherein
   the 3D estimation unit estimates 3D coordinates of the feature points detected from the pair of stereo main images captured by the main imaging unit, and estimates 2D coordinates of the feature points in the moving sub images, and
   the 2D tracking unit tracks the feature points in the plurality of frames of the moving sub images based on the 2D coordinates of the feature points estimated by the 3D estimation unit in the moving sub images, and converts a tracking result into 2D coordinates in the pair of stereo main images.

6. The information processing device according to claim 5, wherein the sub imaging units are selectively switched based on an estimation result of the 2D coordinates of the feature points estimated by the 3D estimation unit in the moving sub images to perform imaging.

7. An information processing method for an information processing device, the method comprising:
- estimating a pose of a moving body based on a pair of stereo main images captured as time-series images by a main imaging unit that includes a stereo camera mounted on the moving body, and that captures moving images at a predetermined frame rate to output a pair of stereo main images as time-series images, and based on moving sub images captured as time-series images by a plurality of sub imaging units each of which is so mounted on the moving body as to have an imaging direction different from an imaging direction of the main imaging unit, and each of which captures the moving sub images at a predetermined frame rate,
- causing the sub imaging units to be selectively switched to start performing imaging based on a preliminary estimation determined in the estimating of the pose, such that feature points of the pair of stereo images are continuously tracked without requiring simultaneous imaging by all of the sub imaging units, wherein each of the sub imaging units includes a stereo camera, and captures moving images at a predetermined frame rate to output a pair of stereo sub images as time-series images; and
- integrating the pose estimated by the main estimation unit and the pose estimated by the sub estimation unit to determine a final pose.

8. A non-transitory computer-readable storage medium storing code for a program that, when executed by a computer, causes the computer to perform a method for controlling an information processing device, the method comprising:
- estimating a pose of a moving body based on a pair of stereo main images captured as time-series images by a main imaging unit that includes a stereo camera mounted on the moving body, and that captures moving images at a predetermined frame rate to output a pair of stereo main images as time-series images, and based on moving sub images captured as time-series images by a plurality of sub imaging units each of which is so mounted on the moving body as to have an imaging direction different from an imaging direction of the main imaging unit, and each of which captures the moving sub images at a predetermined frame rate,
- causing the sub imaging units to be selectively switched to start performing imaging based on a preliminary estimation determined in the estimating of the pose, such that feature points of the pair of stereo images are continuously tracked without requiring simultaneous imaging by all of the sub imaging units, wherein each of the sub imaging units includes a stereo camera, and captures moving images at a predetermined frame rate to output a pair of stereo sub images as time-series images; and
- integrating the pose estimated by the main estimation unit and the pose estimated by the sub estimation unit to determine a final pose.

* * * * *